Jan. 14, 1936. W. B. ATCHINSON 2,027,363
VALVE OPERATING MECHANISM
Filed Oct. 24, 1923 5 Sheets-Sheet 1

Inventor
Walter B. Atchinson

Jan. 14, 1936.   W. B. ATCHINSON   2,027,363
VALVE OPERATING MECHANISM
Filed Oct. 24, 1923   5 Sheets-Sheet 2
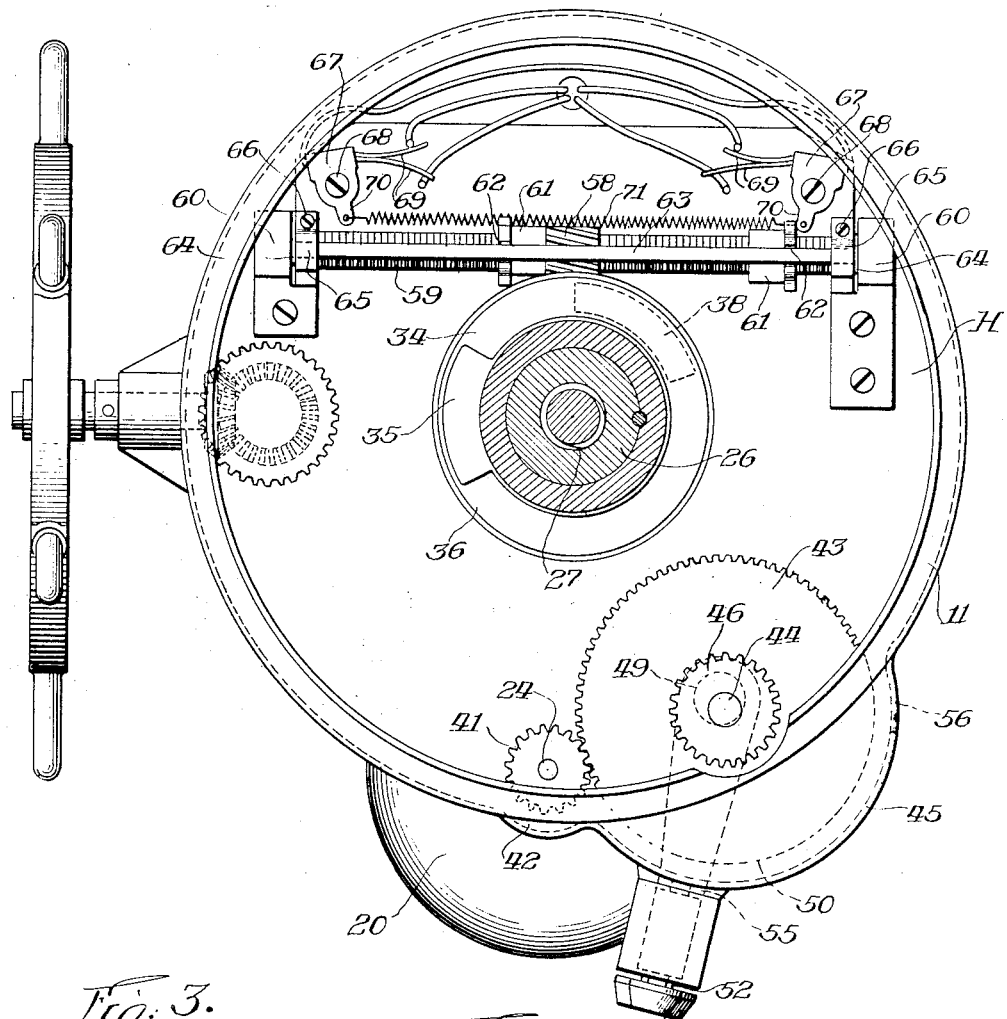
Fig. 2.
Fig. 3.   Fig. 4.
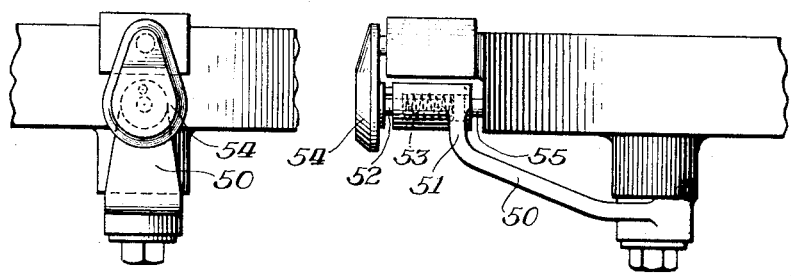
Inventor:
Walter B. Atchinson

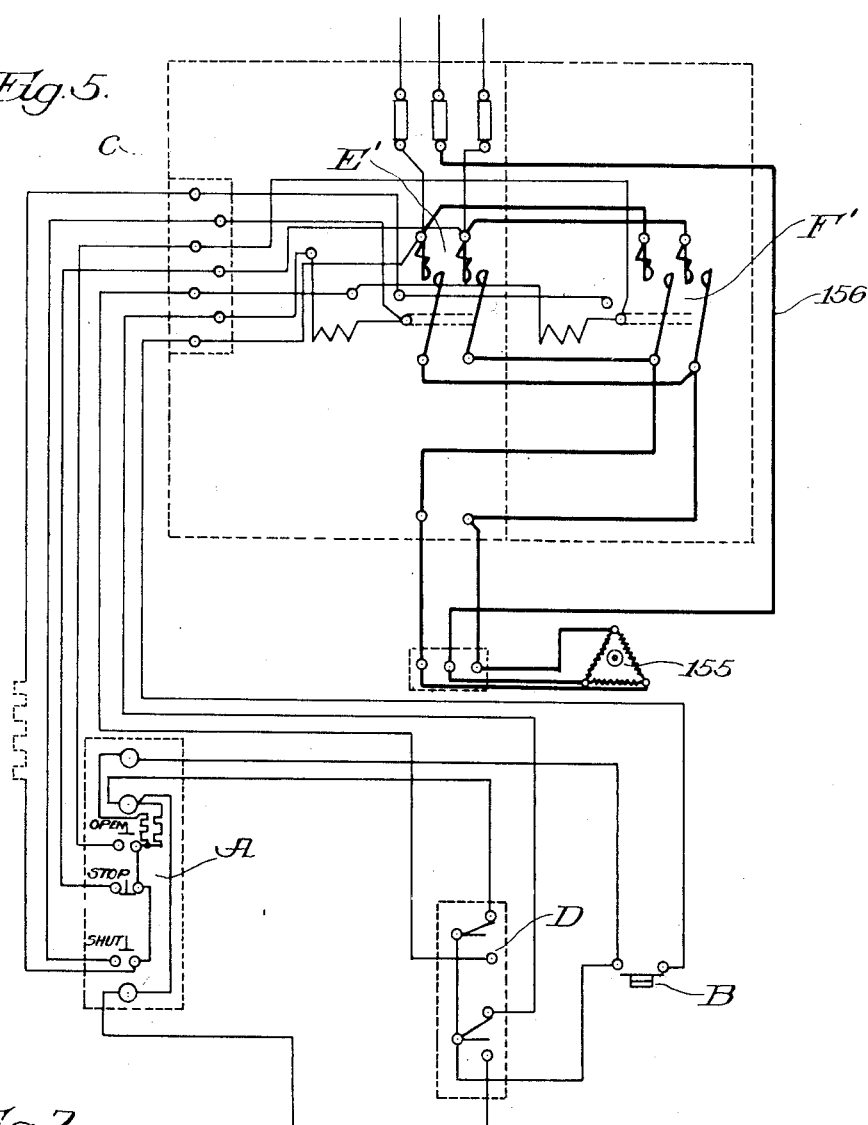
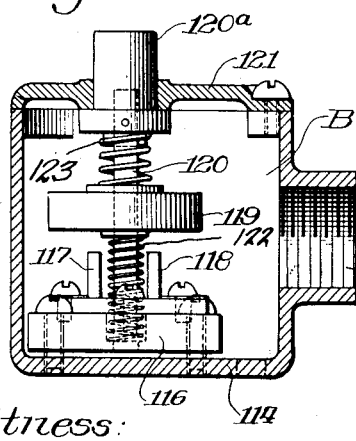
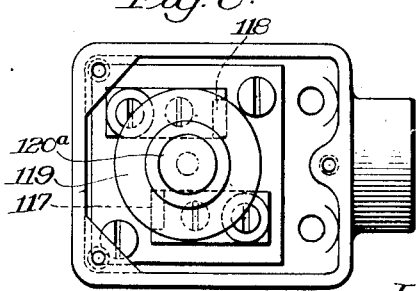

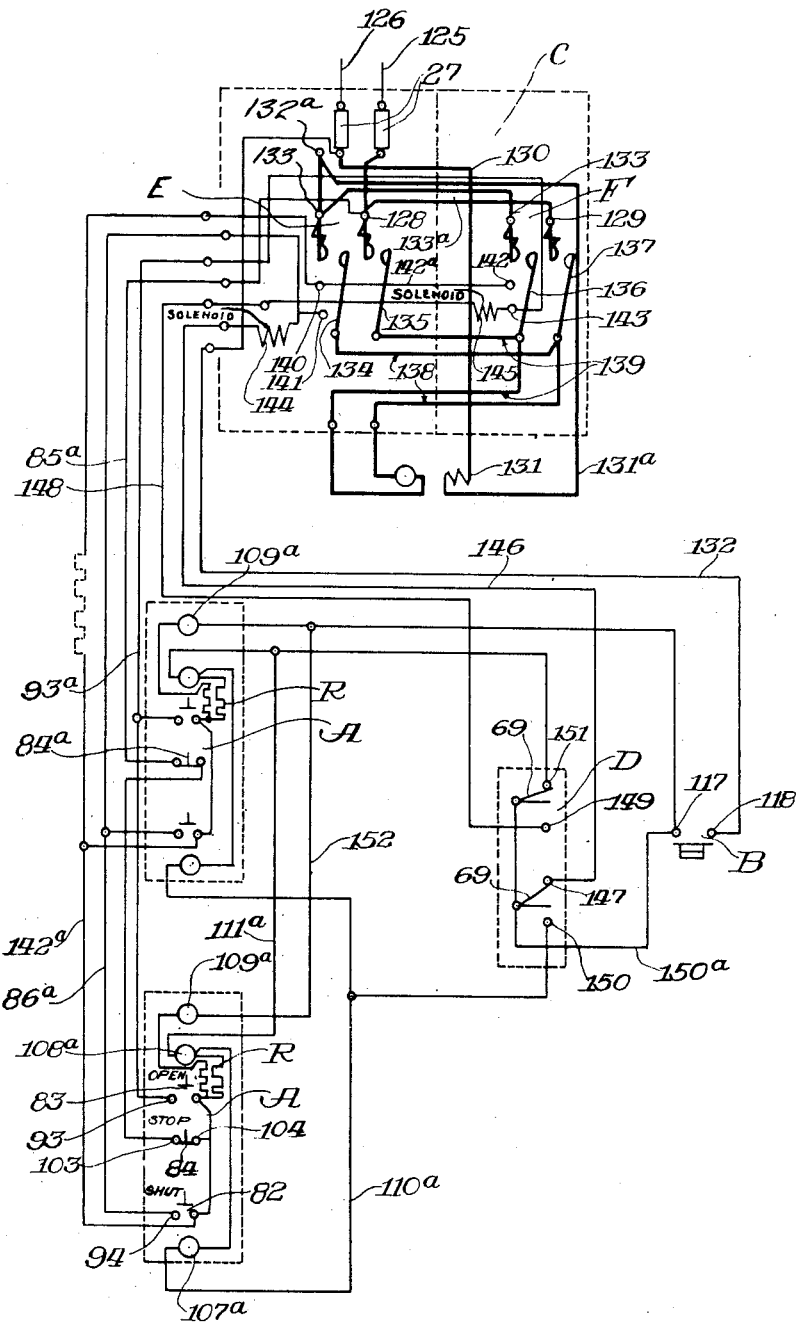

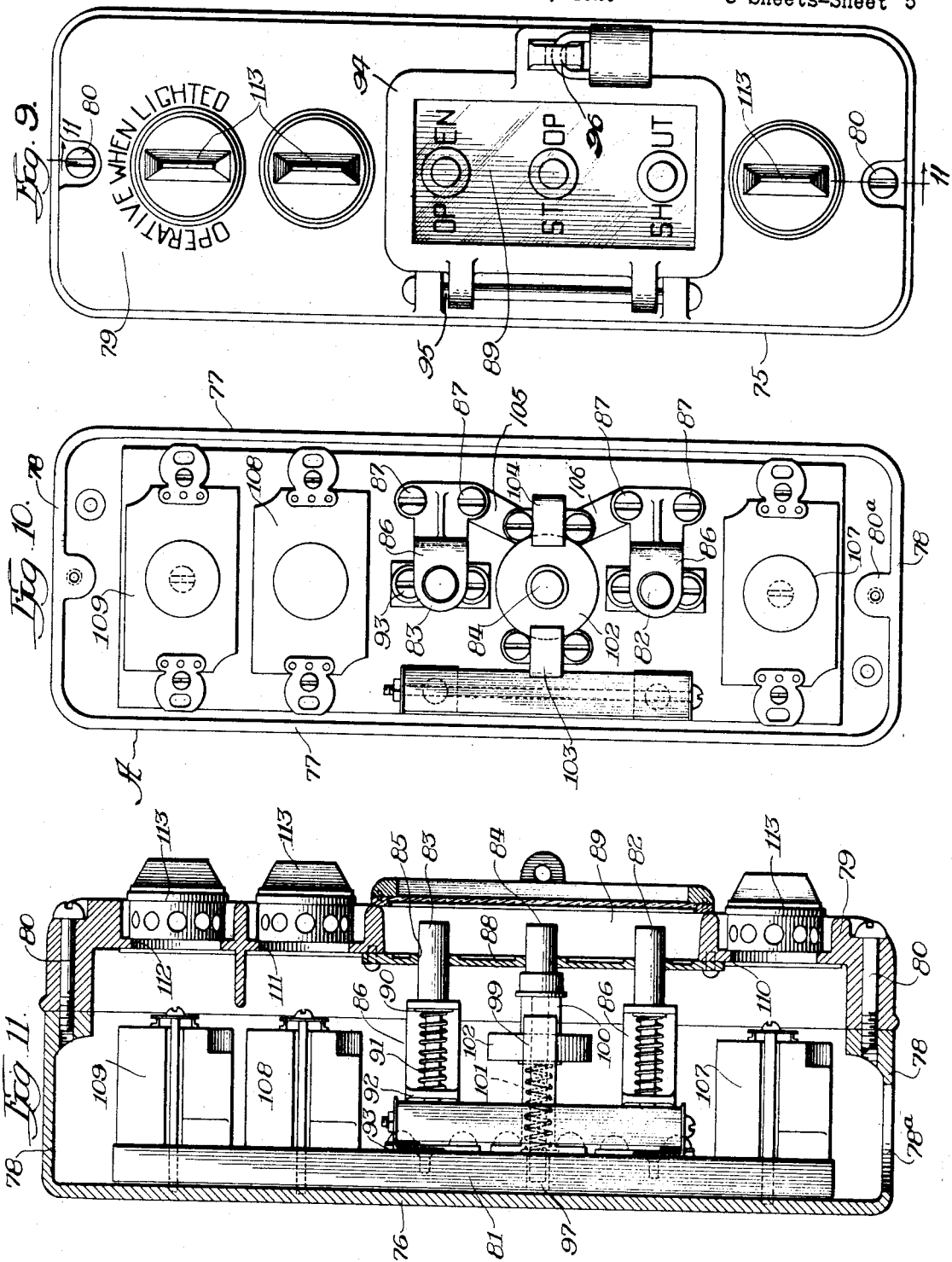

Patented Jan. 14, 1936

2,027,363

UNITED STATES PATENT OFFICE 2,027,363

VALVE OPERATING MECHANISM

Walter B. Atchinson, Indian Orchard, Mass., assignor to The Chapman Valve Manufacturing Company, Indian Orchard, Mass., a corporation of Massachusetts Application October 24, 1923, Serial No. 670,463

9 Claims. (Cl. 177—311)

This invention relates to motion imparting apparatus, and more particularly to such apparatus wherein a limited movement in at least two directions is to be attained, and especially to improved motor operated valves and control means therefor.

While this invention is particularly adapted for use in operating valves and other devices to which a limited movement is to be given, and, as a matter of convenience in illustration, is shown as embodied in a structure for operating a valve, it will be understood that it has a wide field of utility for other purposes.

The principal objects and advantages of this invention reside in the provision of an improved motion transmitting mechanism; the provision of an improved motor operated motion transmitting mechanism and control means therefor; the provision of improved motion transmitting mechanism and indicating means therefor; the provision of improved motion transmitting means and improved control and indicating means therefor; the provision of improved motion transmitting mechanism and improved electrical control and indicating means therefor; the provision of improved motion transmitting mechanism, and improved power operated means and indicating means; the provision of improved motion transmitting mechanism and improved power operated means, control, and indicating means therefor; and the general provision of improved means for operating, controlling and rendering indications of operation of an improved motion transmitting mechanism.

Other equally as important objects reside in the provision of an improved control mechanism; the provision of an improved indicating mechanism, the provision of an improved control and indicating mechanism; the provision of an improved control mechanism for electrically operated devices; the provision of an improved indicating mechanism for electrically operated devices; the provision of an improved control and indicating mechanism for electrically operated devices; the provision of an improved electrical control mechanism; the provision of an improved electrical control and indicating mechanism, and the provision, in combination with electrically or other power or manually operated devices, more particularly valves of improved operating, control and indicating mechanism therefor.

This invention is further characterized by the provision of means for imparting motion, and improved electrically operated means for indicating that such motion imparting means is in operable position; the provision, in combination with an element to be moved, of improved electrically operated means for indicating that such element is in position to be operated; the provision, in combination with an element to be moved and electrically operated means for moving said element, of means for indication that such element is in position to be operated electrically; the provision, in combination, of an element to be moved, and electrically operated means for moving said element, of improved electrically operated means for indicating that the element and said means are in operable relationship; the provision, in combination with an element to be moved and electrically operated means for moving said element, of improved electrically operated means for indicating that said element and operating means are in operable relationship; the provision of improved means, in combination with an element to be moved and electrically operated means for moving it, which serves to render said operating means inoperative when the latter and said element to be moved are not in operable relationship; the provision, in combination, of an element to be moved, electrically operated means for imparting motion thereto movable into and out of operative relationship therewith, and improved electrically operated means for indicating when they are in operable relationship; the provision, in combination, of an element to be moved, electrically operated means for imparting motion thereto movable into and out of operative relationship therewith, and improved means for controlling the circuit of the electrically operated means according to the operative relationship of the latter and said element to be moved.

Among the objects and advantages of the present invention, more particularly as applied to valve operation, for instance, are the embodiment in a unit structure of improved means for operating various types, arrangements and sizes of valves and other similar mechanisms; the embodiment in a structure of means whereby the valve, or the like, may be operated manually or electrically or by other power means, and whereby an indication of the condition and position of the valve with respect to such power operated means and with respect to the valve seat may be determined at a point remote from the valve; and the provision in combination with a manually operable valve, and electrically operated means for operating the valve, of an improved means for indicating the relationship of said valve and operating means and for controlling the circuit of said electrically operated means accordingly.

The foregoing, as well as such further objects and additional benefits and advantages as may hereinafter appear or be pointed out, I attain by means of a construction, one embodiment of which is illustrated in the accompanying drawings wherein:—

Figure 2 is a plan view, partly in transverse section, of the operating mechanism;

Figure 3 is a fragmentary elevational view of a portion of the device shown in Figure 2;

Figure 4 is a view similar to Figure 3 viewed from the right hand of Figure 3;

Figures 5 and 6 are diagrammatic views illustrating alternative circuit arrangements;

Figure 7 is a sectional view of a switch mechanism.

Figure 8 is a plan view, (with cover removed) of the switch shown in Figure 7;

Figure 9 is an elevational view of the switch station or box for controlling the valve electrically;

Figure 10 is a view of the same with cover removed; and

Figure 11 is a longitudinal sectional view taken on the line 11—11 of Figure 9, looking in the direction indicated by the arrows.

Figure 1:
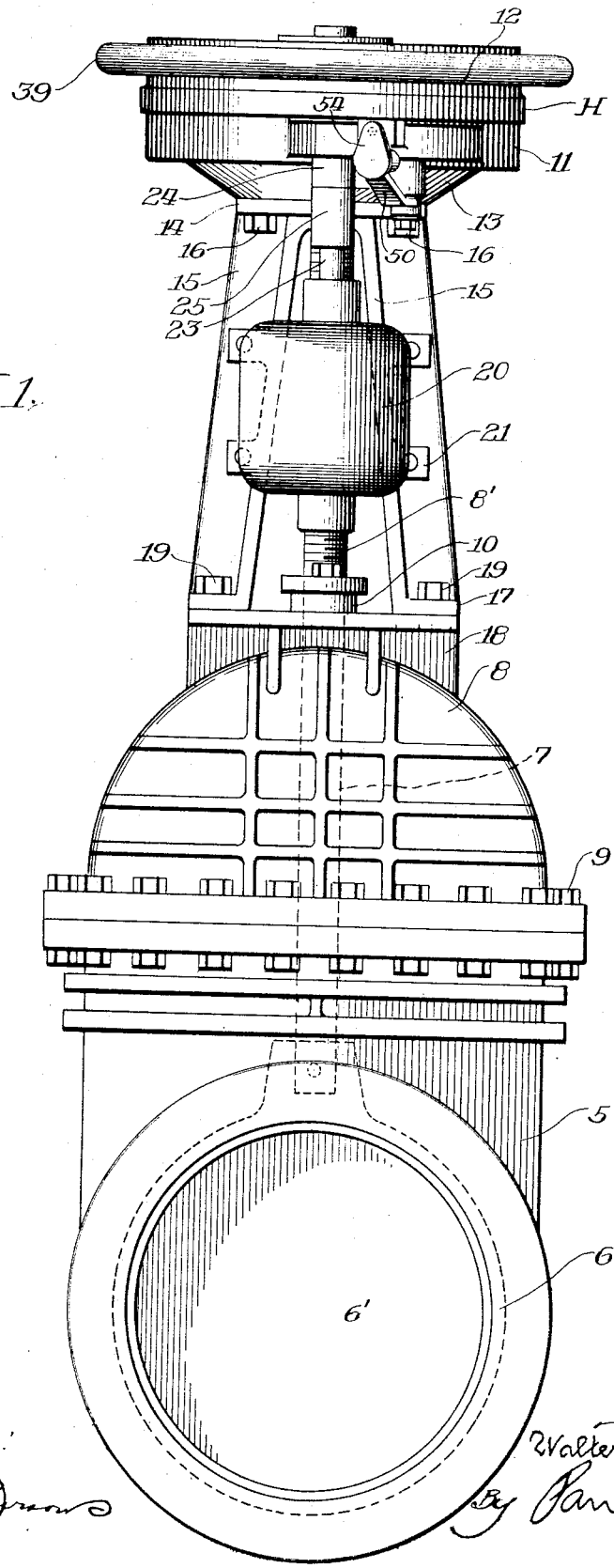
Figure 1 is a side elevational view of a valve and operating mechanism.

Referring now in detail to the drawings, wherein this invention is embodied in a structure particularly adapted for operating valves, and is shown as applied to a valve of the well-known gate type, 5 is the valve casing, this casing having the usual port 6 across which is slidable the blade of the valve 6', this valve being carried on one end of an operating member, such as a valve stem 7, which extends upwardly through the center of the valve casing 5 into and through the top of the detachable head 8 secured to the casing 5 by the bolts 9. The valve stem 7 extends through a fluid tight packing gasket 10 mounted on the top of the head 8 and is provided with a threaded portion 8' beyond the head 8.

The structure so far described is that usually embodied in any sliding gate valve, and as previously pointed out one of the objects of the invention is to mount the valve operating device as a unit upon the valve, for operation either manually or by means of a motor. To this end the structure to be described hereinafter has been designed.

As shown generally in Figure 1, the invention includes a housing H composed of the lower portion 11 and the upper portion 12, which housing contains the power transmission gearing and clutch means for controlling the same. The lower portion 11 is provided with a depending substationally circular enlargement 13 which seats upon a similarly formed head 14 into suitably threaded recesses in the bottom face of the enlargement 13, thus fixedly mounting the housing upon the legs 15. The legs 15 are provided with foot portions 17 which are of suitable breadth to engage evenly the upper surface of the platform 18 usually cast integrally with the head 8, suitable bolts 19—19 extending through the foot portions 17 into the platform 18 for fixedly connecting the standard comprising the legs to the valve casing. Thus the housing for the transmission gearing, to be presently described, is rigidly disposed on the valve casing.

The power operating means for the device of this invention is preferably an electric motor 20, the casing of which is provided with feet 21—21 for securement to lugs formed in complemental pairs on the legs 15 so as to support the motor directly upon the legs about midway of the length of the same. The motor shaft 23 extends parallel to the valve stem 7, but to one side of the enlargement 13, said shaft 23 being connected to a shaft 24, which extends from the portion 11 of the housing, by means of a sleeve 25. Of course, any other suitable means may be provided for connecting the shafts 23 and 24.

Transmission gearing is contained in the housing H composed of the sections 11 and 12, the former section being fixedly mounted on the standard and the latter being rotatable and connected operatively with the threaded part 8' of the valve stem through a lost motion connection for imparting rectilinear movement thereto within certain limits. The connection between the section 12 of the housing and the threaded part of the valve stem preferably includes a sleeve 26 provided with an internally threaded bore 27 which engages the valve stem, the sleeve being separate from and rotatably mounted in a vertically extending axial hub, preferably cast integrally with the top section 12 of the housing. Thus the sleeve 26 is rotatable relative the hub through certain limits governed by the lost motion arrangement to be presently described.

The bottom portion 11 of the housing is provided with an upstanding axial hub which extends to a point about midway of the sleeve 26, but in spaced relation to the lower end of the hub. The sleeve is freely rotatably mounted in the hub and is retained against longitudinal movement in either of the hubs by means of a collar which encircles the upper projecting end of the sleeve and is secured thereto by key screws and a second collar which is threaded to the lower end of the sleeve and lies in an annular recess formed in the base of the portion 11.

Between the adjacent ends of the hubs a laterally extending annular flange 34 is provided, having a segmental lug formed integrally therewith and with the sleeve. A worm 36 is secured to the flange 34 by means of screws, said worm lying between the upper end of the hub and said flange 34, and performing a function which will presently appear. The lower end of the hub is provided with a segmental lug 38, shown in dotted lines in Figure 3, and arranged in the plane of the lug 35, these lugs or abutments being adapted to engage, when motion is imparted to the upper section 12 of the housing, either manually or by the power transmission gearing from the motor as will appear presently.

To the end that the necessary rotary motion may be manually imparted to the upper section 12 of the housing, the latter is provided with a hand-wheel 39 integrally cast with the upper section 12 through the medium of webs.

The transmission gearing which comes into play when the motor is used preferably comprises a pinion 41 mounted on the upper end of the stub-shaft 24 within an enlarged chamber 42 formed integrally with the bottom section 11, this pinion 41 being adapted for meshing engagement with a relatively large gear 43 mounted upon a laterally shiftable shaft 44, another enlarged segmental chamber 45 being formed on the section 11 to accommodate said gear 43. The shaft 44 carries on its upper end a pinion 46 which is adapted for meshing engagement with the internal ring-teeth formed on the peripheral wall of the upper section 12 of the housing 8. The shiftable shaft 44 is in the nature of a trunnion and is eccentrically mounted upon a bearing stud 49 which extends through a bearing in the bottom wall of the lower section 11, this stud being eccentric to the shaft 44 but concentric with the segmental face of the chamber and receiving on the lower free end a lever arm 50. The free end of the lever 50 is provided with an upstanding lug 51 which is bored to receive a locking plunger 52, this locking plunger being restrained against outward movement by a helical spring 53 which surrounds the plunger, the plunger carrying a knob 54 by which the same may be withdrawn from engagement with one or the other of the apertures 55 and 56 formed in the segmental wall of the chamer 45. Thus by shifting the lever arm from one position to another, the pinion 46 may be engaged and disengaged with the teeth on the upper section. In this manner the motor may be readily disconnected from the rotatable part of the housing H, when it is desired to manually operate the valve, or when the motor is disabled, it being seen that when the motor is driving, the shaft 24 is connected to the upper section 12 through the transmission gearing.

The remaining details of construction of the valve, gearing and housing will be found described and disclosed in the patents to E. T. Smith, Nos. 1,587,869, June 8, 1926; 1,562,596, November 24, 1925, and 1,562,597, November 24, 1925.

I provide means for controlling the motor circuit within certain limits, this means being operated by the worm 36 and comprising a worm gear 58 in meshing engagement with the worm and mounted upon the medial portion of the screw-rod 59 and rotatable therewith, which rod is mounted at its ends in bearings 60—60 carried by the base of the housing section 11. A pair of nut stops 61 are mounted upon and in threaded engagement with the rod 59, these nuts having each a plurality of notches 62 for receiving the guide-rod 63, this guide-rod preventing turning of said nuts and extending above and parallel with the screw-rod 59 and seating at its ends in recesses 64—64 formed in the upper faces of the bearings 60—60. As best shown in Figure 2, the guide-rod is retained against accidental displacement by flat strips 65—65 having each one free end screwed at 66 to the bearing thereof. A pair of blocks 67 are pivoted at 68 on an insulated base on the section 11, near the bearings 60, and pairs of circuit controlling elements 69 are carried by said blocks. The blocks have extensions 70—70 connected by a contractile helical spring 71, and said extensions are disposed in the path of movement of the respective stop nut therefor, so that when the nut for either of said circuit controllers strikes same the motor circuit is broken. The relative positions of the nuts 61 on the screw-rod may be varied by releasing one end of the guide-rod 63 and rotating one or the other of the nuts on the screw-rod, and then returning the guide-rod to position.

The lower section 11 and the upper section 12 of the housing have a dust proof junction preferably comprising an annular horizontal flange on the section 11 and an upturned flange, which latter lies within the peripheral wall of the section 12 and cooperates therewith to prevent the entrance of foreign matter into the housing. The wall of the upper section 12 is likewise provided with a depending annular flange which lies outside the annular wall of the portion 11 to close the space between this wall and the peripheral wall. The flanges are interrupted to permit the pinion 46 to engage the teeth on the section 12.

Referring now to the electrical control and indicating mechanism, and first to the switch structures, whereupon a description of the circuits will follow, I provide a so-called control station, designated A in its entirety, and best shown structurally in Figures 9, 10, and 11.

In this construction, which, of course, may be varied to suit conditions, there is provided a housing 75, preferably rectangular in shape and including the bottom wall 76, sides 77—77 and ends 78—78, the lower end wall as viewed in Figure 11, being provided with an opening 78a for the accommodation of electrical conductors, as will be obvious.

A cover or top wall 79, hereinafter termed an indicator plate, is applied to the open front of the housing or container 75, by the provision of bolts or screws 80—80 which pass through the indicator plate or cover into the enlarged portions 80a of the end walls of the housing.

Within the housing, beneath the indicator plate, on an insulating bed plate 81, are mounted the switches 82, 83, and 84, which are, respectively, the closing, opening and stopping switches, for controlling the motor circuits hereinafter described.

The switches 82 and 83 are of the types known as normally open, and the switch 84 is of the normally closed type. The normally open switches are identical and therefore but one is described. This switch comprises a rod 85, mounted slidably in a bracket 86, which latter is fixedly secured to the bed plate by the provision of screws 87, the rod 85 having its outer end enlarged and projecting through a suitably apertured guide plate 88, secured in the bottom of the pocket 89 provided in the indicator plate.

The medial portion of the rod 85 is provided with an annular flange 90 which abuts the inner surface of the plate 88, and limits the outward movement of the rod in response to the action of the helical spring 91 which surrounds said rod and abuts the inner side of the bracket 86.

The other end of the spring 91 abuts the inner end of the bracket, as at 92, and tends to maintain the switch open. The inner end of the rod 85 contacts, when depressed with a contact plate or lug 93, secured to the insulating bed plate 81, (Figures 10 and 11) said plate 93 being permanently connected to one side of the circuit controlled by said switch.

A glass covered door 94, hinged at 95, normally closes the pocket 89, and is suitably locked at 96 so that only the persons properly authorized may have access to the switches. The guide plate has the proper designating words engraved or otherwise placed thereon (Figure 9) adjacent the proper switch elements so that mistakes in operating cannot occur readily.

The switch 84, being normally closed, as stated, conveniently comprises the operating rod 99 slidably mounted in the guide plate 88 of the rod being guided in socket 97 in the plate 81.

A helical expansion spring 101 is disposed below the inner end of the rod 99 so that this rod is normally forced outwardly, and said rod carries a metallic disk 102 which serves to complete the circuit by contact with the two spaced contact members 103 and 104, secured in turn to the base 81.

The brackets 86 and the contact member 104 are all connected together electrically by the provision of straps 105—106, as best seen in Figure 10.

I provide means for indicating the position of the valve or other device operated, and in this instance I employ an electric lamp, not shown, in each of the sockets, 107, 108, and 109. These sockets are disposed immediately below the openings 110, 111, and 112 in the indicator plate, and said openings are closed by glass plates 113—113. The lamps below the plates 113 in the openings 110 and 111 indicate the condition of the valve, as to its position with respect to its seat, or whether it is open or closed, and the lamp below the opening 112 indicates, as will hereinafter appear whether the device is in position for motor operation.

In order to cut out the motor circuit when the motor is mechanically disconnected from the valve, I provide an automatic local switch structure which may be termed a clutch or in gear switch shown in Figures 7 and 8, this device being of the normally open type, so that when released, the circuit is opened.

In this instance, I provide a casing 114, having an internally threaded nipple 115 whereby conductors may be afforded entrance to the casing 114.

Within the casing I provide an insulating base 116, on which is mounted a pair of spaced contact plates or lugs 117 and 118, lying in the path of movement of the metallic disk 119 carried by the operating rod 120 of the switch.

The operating rod has one end provided with an insulating button 120a projecting from and slidable in the cover plate 121, and the other end slidable in the insulating plate 116. Thus is the rod guided in its operation. The disk 119 may or may not be insulated from the rod and is adapted to contact with the two members 117 and 118 and close the circuit when said rod is depressed. Helical springs 122 and 123 surround the rod 120 and the spring 122 serves to tend to maintain the rod in the outer position, or in other words to maintain the switch open. The spring 123 merely serves to counterbalance the rod and render more smooth the operation thereof.

The casing 114 is fixedly secured in any suitable manner to the immovable section 11 of the housing H, and immediately above the point at which the operating lever plunger is located when the valve is set for motor operation, as best seen in Figures 3 and 4. The member 54 has an extension 54a thereon which is adapted to press against the button 120a when in proper position, whereby to depress the same and thereby close the switch.

This switch is hereinafter designated the "in-gear switch" and has been given the ordinal "B" in the circuit diagrams. It will be understood that the in-gear switch is interposed in effect directly in the motor circuit and therefore, when the motor is mechanically disconnected from the valve it cannot be started, which prior to the present invention has resulted in injury to the motor, where permitted to run light, due to its construction and winding as a series motor.

In view of the fact that the circuit connections may be easily traced, a detail description of each conductor and its connection is not believed to be necessary here, immaterial details therefore being omitted.

Each motor unit is controlled directly, that is, the starting, stopping and reversal of the motor is controlled from a contactor station, so that the device is characterized by the provision of remote control for one or a group of the devices.

This contactor mechanism is best shown in Figures 5 and 6, the circuits of Figure 5 being arranged for operation by polyphase alternating current, and that of Figure 6 being arranged for operation by direct current. The detail connections are but slightly changed in shifting from D. C. to A. C. or vice versa, and for convenience, I will describe the direct current form first.

Referring to Figure 6, A—A are two control stations, which may or may not be adjacent to each other, and which may be situated at a convenient point in the valve house. D indicates the limit switches for one valve, which are shown in Figure 2 and previously described; C is the contactor group of line or reversing switches which includes a mechanical interlock, and B is the local in-gear switch.

Power from a convenient source is supplied to the apparatus over the conductors 125 and 126, it being assumed that the former is the positive side and the latter the negative side of the line. The apparatus is protected by the fuses 127.

The conductor 125 is divided and terminates at the contact members 128 and 129, and the conductor 126 is similarly divided, extension thereof leading at 130 to the field 131 of the motor, and a conductor 132 leading to one of the contact plates or terminals of the in-gear switch. The other side of the field winding is connected by the conductor 131a to the switch terminal 132a, and this terminal is connected with the terminal 133, by the provision of a conductor 133a.

The terminals 128, 129, 132a, 133 are arranged with blowout coils, for an obvious purpose.

The terminals 128 and 132a form part of the switch E, further comprising the contactor arms 134 and 135. The terminals 129 and 133 form part of the switch F, which further includes the contactor arms 136 and 137.

The arms of each of the switches E and F are connected so as to move in pairs for controlling the motor circuit, and said pairs are interlocked mechanically so that when one switch is closed the other is maintained in open position.

The switch arms 134 and 137 are connected by the conductor 138 and the arms 135 and 136 are connected by the conductor 139, the conductors 138 and 139 being extended as shown to the opposite sides or terminals of the motor.

It will be observed from the foregoing that in accordance with which one of the switches is "in" depends the flow of the current through the armature, that is, the flow of the current through the field in operation is constant as far as direction is concerned, but I reverse the flow of current in the armature, this being common practice to attain the reversal of a direct current motor. The windings of the motor and their connections are such that a series motor is provided, since it is necessary practically to start the motor under load, but it is quite conceivable that a shunt wound motor or a compound motor might be as readily employed in some installations. I do not therefore wish to be limited to the disclosure of a series wound motor.

The switch arm 134 is provided with an insulated metallic contact plate which bridges the terminal members 140 and 141 when the switch is closed, and similarly the switch arm 136 bridges the pair of terminals 142 and 143 when closed, the terminals 140 and 142 being connected by a conductor 142a.

A solenoid 144 is mechanically connected to the switch E and a similar solenoid 145 is similarly connected to the switch F.

The solenoid 144 has one end of its winding connected to the terminal 141 and the other end of its winding connected by a conductor 146 to one of the terminals, 147, which forms part of the limit switch D and is in position to be contacted by one of the members 69 of said switch.

The solenoid 145 is connected at one end to the terminal 143, and the other side of the solenoid 145 is connected by a conductor 148 to a terminal 149 on the limit switch D and is in position to be contacted with by one of the movable members 69 of said limit switch.

The conductor 142a extends to both of the controlled stations shown in Figure 6 but for the purposes of this description will be described as extending to one only of said stations, as the connections for both stations are substantially identical. This conductor 142a is connected commonly to one side of each of the switches 82, 83, and 84 by connection to one of the brackets 86.

The lamp 107a is connected through a resistance R to the conductor 142a and similarly are connected the lamps 108a and 109a.

The other side of the lamp 107a is connected by a conductor 110a to a terminal 150 of the limit switch D; the lamp 108a is connected by a conductor 111a with a terminal 151 of said limit switch; and the lamp 109a is connected by a conductor 152 with the contact member 117 of the in-gear switch so that when said switch is closed, that is the valve is in position to be motor operated, the lamp 109a will be lighted.

It will be obvious that the lamps 107a and 108a will be alternately lighted in accordance with the relative position of the two limit switch members 69—69. With these members in the position shown the lamp 108a is burning and the lamp 107a is extinguished, thereby giving an indication that the valve, for the purposes of this discussion is in the open position or off its seat.

The terminal 93 of the switch 83 is connected by a conductor 93a to the terminal 143 so that when said switch is closed current will flow from the conductor 142a via conductor 93a to the solenoid, thence through conductor 148 to terminal 149, but as shown the limit switch prevents operation of the motor because the valve is already in the open position. If the member 69 at the top of the switch D is in contact with the terminal 149 (valve closed) then current flows through the conductor 150a via the in-gear switch B, conductor 132, to the line conductor 126, thus completing the ciruit for a visual indication at the lamp 108a.

The stop switch 84 is connected in series with the stop switch 84a of the other control station, and thence by a conductor 85a to the line terminal 128 and the terminal 94, of the switch 82 is connected by a conductor 86a to the terminal 141.

In the operation of the device disclosed in Figure 6, assuming that the valve is open as indicated by the burning of the lamp 108a, and it is desired to close the valve, the switch 82 is closed, whereupon current flows from conductors 125 and 85a through the conductor 86a to the solenoid 144 thence through conductor 146 to the lower switch element 69 of the limit switch, conductor 150a, in-gear switch B, conductor 132, and back to the other side of the line 126. Energization of the solenoid 144 closes the switch E and current then flows from the conductor 125 through arm 135, conductor 139, through motor armature to conductor 138, thence through switch arm 134, and conductor 131a to the field winding 131, thence to the other side of the line by the conductor 130. The motor thereupon starts to close the valve and at the proper instant one of the nuts 61 opens the limit switch contact member 69, which, in this case, would be the lower one shown in Figure 6, then deenergizing the solenoid 144 and permitting the switch E to open. When the switch E closes at the start, and in view of the fact that the switch 82 does not remain closed, the circuit through the solenoid 144 is completed by the bridging of the contact terminals 140 and 141, so that the solenoid is maintained energized until the limit switch performs its function.

Just as soon as the limit switch opens the solenoid circuit it closes the circuit to the lamp 107a, and thereby gives a visual indication that the valve is closed.

As long as the valve is set for motor operation, current will flow through conductors 142a 125, 85a switch 84 and; through the lamp 109a, conductor 152, in-gear switch B and conductor 132, so that a visual indication will be given that the valve is ready for motor operation. If, for any reason, this circuit should accidentally become interrupted or the motor mechanically disconnected from the valve, interrupting the circuit, or in the event that the limit switch itself is not properly closed, the lamp 109a would be extinguished, and the operator would be thereby apprised of trouble, with a fairly accurate indication of just where the trouble is.

It is unnecessary to describe in detail the operation when opening the valve, because this is but a repetition of that already described, the exception being that the switch F is caused to function and thus reverse the direction of current in the armature of the motor and change its direction of rotation.

In the event that it is desired during the opening or closing of the valve to stop the operation, the operator merely presses on the switch 84, which, as will be obvious, will result in instantly interrupting the current with a resultant deenergization of the particular solenoid then in operation, thus stopping the motor, which cannot again be started until one or the other of the switches 82 or 83 is closed.

The operation of the device when used in polyphase alternating current installations is substantially identical with that already described, Figure 5 illustrating at 155 an alternating current motor of the self-starting induction type or other suitable construction controlled by the switches E' and F'. As the operation of this form of the device is substantially identical with that already described, and as the only changes made are the provisions of a third conductor 156, it will be unnecessary to describe this arrangement in detail.

Having thus described my invention and illustrated its use, what I claim as new and desire to secure by Letters Patent is:

1. In a device of the character described, in combination a mechanism arranged to operate a valve and including an element to be driven, a motor for driving said element, and a clutch for detachably connecting said motor and element to permit manual operation of the valve, locking means for said clutch, remote control means for said motor including a master switch structure situated distant from said valve, line switches controlled thereby and serving to energize the motor, and a local switch in series with said master switch structure and actuated to closed position by said locking means irrespective of said line switches when said motor and element to be moved are operatively connected through said clutch.

2. In a device of the character described, in combination a mechanism arranged to operate a valve and including an element to be driven, a motor for driving said element, and a clutch for detachably connecting said motor and element to permit manual operation of the valve, remote control means for said motor including a master switch structure situated distant from said valve, line switches controlled thereby and serving to energize the motor, limit switches for controlling the movement of said valve, means including gearing and nut members actuated thereby for engaging said switches and a local switch in series with said master switch structure and controlled by the manipulation of said clutch to move to open position irrespective of said limit switches when said motor and element to be moved are operatively disconnected by said clutch.

3. In a device of the character described, in combination, an element to be moved within predetermined limits, an electric motor for imparting movement to said element to be moved, a line switch for said motor, and a master switch actuating said line switch, manually operable means for operatively connecting and disconnecting said motor and said element to be moved, a local switch in series with said master switch and operated by said manually operable connecting and disconnecting means, a limit switch operated at all times by said element to be moved controlling said line switch and governing the operation of said motor, visual signals operated by said limit switch indicating the position of said element to be moved, and a visual signal indicating the position of said manually operable connecting and disconnecting means.

4. In a device of the character described, in combination, a mechanism arranged to operate a valve and including an element to be driven, a motor for driving said element, and a clutch for detachably connecting said motor and element to permit manual operation of said element, remote control means for said motor including a master switch situated distant from said valve, line switches operated by said master switch, controlling the energization of said motor for operation in opposite directions, limit switches operated by said element to be driven, controlling said line switches and the operation of said motor, means for indicating the position of the valve controlled by said limit switches, a local switch adapted to open the motor circuit when said clutch is disengaged, and means indicating the position of said clutch operated by said local switch.

5. In a device of the character described, in combination a mechanism arranged to operate a valve and including an element to operate a valve and including an element to be driven, a motor control for driving said element, and a clutch for detachably connecting said motor and said element to permit manual operation of the valve, remote control means for said motor including a master switch structure situated distant from said valve, a line switch structure controlled by said master switch structure and serving to energize the motor, limit switches permanently connected so as to be operated by said element to be moved, for controlling the movement of said valve, and a local switch in series with said master switch structure and controlled by the manipulation of said clutch to open the motor-circuit independently of said limit switches when said motor and said element to be moved are operatively disconnected.

6. In a device of the character described in combination, an element to be moved, an electric motor for operating said element to be moved, mechanical connecting means for said motor and said element including displaceable gear elements, a lever oscillatable about the axis of one of said gear elements for disconnecting said gear elements, line switches in the circuit of said motor for controlling the same, limit switches controlling the operation of said line switches permanently connected so as to be operated by movement of said element to be moved, and a switch disposed in the path of movement of said lever and connected in series with said limit switches, said lever having an extending portion for engagement with and for operating said last-mentioned switch when said lever is in one of its positions.

7. In a valve operating mechanism, an element to be moved, means including an electric motor disconnectibly connected to and for actuating the element to be moved, limit switches for stopping the motor within limits, line switches for controlling the direction of motion of the motor and element to be moved, electromagnetic means for actuating said line switches and for holding the same in closed position, master switches for controlling said electromagnetic means in the circuit thereof so as to permit independent operation of the motor from a plurality of separate master switch stations, and a local switch operable upon mechanical disconnection of the motor from the element to be moved to open the circuit of the master switches.

8. In a valve operating mechanism, in combination, an element to be moved, means including an electric motor disconnectibly connected to said element to be moved for moving the same, manual means for disconnecting said motor from said moving means, line switches interposed in the circuit of said electric motor for controlling the same; a control circuit for governing the operation of said line switches including electromagnetic means for actuating said line switches, a master switch structure controlling said electromagnetic means from a plurality of independent remote points, limit switches so connected as to be operated by said element to be moved controlling said electro-magnetic means and a local switch operated by said manual means for rendering said control circuit inoperable when said motor is disconnected from said element to be moved; and a means for visual indication at a plurality of independent remote points of the position of said element to be moved interposed in said control circuit and controlled by said limit switches and said local switch.

9. In combination, an element to be moved, an electric motor disconnectibly connected to said element, clutch means for disconnecting said motor from said element, a motor circuit for said motor so arranged as to permit the motor to be operated in either direction, line switches in said motor circuit for controlling the operation of said motor, a control circuit including electromagnetic means for the operation of said line switches, a plurality of master switch structures in said control circuit for permitting the operation of said electro-magnetic means from a plurality of independent remote points, a limit switch in said control circuit operated by said element to be moved and controlling said electromagnetic means to open said line switches and de-energize said motor, a local switch in said control circuit operated by said clutch means to open said circuit when said motor is disconnected from said element to be moved, and means interposed in said control circuit and controlled by said limit switch and said local switch indicating the position of said element to be moved and the position of said local switch at a plurality of independent remote points.

WALTER B. ATCHINSON.